US012298406B2

(12) United States Patent
Han et al.

(10) Patent No.: US 12,298,406 B2
(45) Date of Patent: May 13, 2025

(54) ILLUMINATION DEVICE AND ELECTRONIC DEVICE INCLUDING THE SAME

(71) Applicant: SAMSUNG ELECTRONICS CO., LTD., Suwon-si (KR)

(72) Inventors: Seunghoon Han, Seoul (KR); Jangwoo You, Seoul (KR); Byunghoon Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 106 days.

(21) Appl. No.: 17/970,258

(22) Filed: Oct. 20, 2022

(65) Prior Publication Data
US 2023/0044142 A1 Feb. 9, 2023

Related U.S. Application Data

(62) Division of application No. 16/434,614, filed on Jun. 7, 2019, now Pat. No. 11,624,832.
(Continued)

(30) Foreign Application Priority Data

Mar. 20, 2019 (KR) .................... 10-2019-0031771

(51) Int. Cl.
*G01S 17/894* (2020.01)
*G01S 7/481* (2006.01)
(Continued)

(52) U.S. Cl.
CPC .......... *G01S 17/894* (2020.01); *G01S 7/4813* (2013.01); *G02B 3/0056* (2013.01);
(Continued)

(58) Field of Classification Search
CPC .. G02B 5/0221; G02B 5/0215; G02B 5/0278; G02B 6/003; G02B 6/0015; G02B 6/002;
(Continued)

(56) References Cited

U.S. PATENT DOCUMENTS 7,936,983 B2 5/2011 Konno et al.
8,395,601 B2 3/2013 Nho et al.
(Continued)

FOREIGN PATENT DOCUMENTS

CN 204537649 U 8/2015
JP 2010-145583 A 7/2010
(Continued)

OTHER PUBLICATIONS

Communication issued on May 28, 2024 by the Korean Intellectual Property Office for Korean Patent Application No. 10-2019-0031771.

*Primary Examiner* — Angela M. Medich
(74) *Attorney, Agent, or Firm* — Sughrue Mion, PLLC

(57) ABSTRACT

An illumination device includes a display panel including a first surface on which an image is displayed, a second surface opposite to the first surface, display pixels interposed between the first surface and the second surface, and a transmitting window interposed between the first surface and the second surface. The illumination device further includes a light source disposed on a side of the second surface of the display panel, and emitting light toward the second surface, and a light transmitter interposed between the light source and the display panel, and transmitting the emitted light to the transmitting window, the transmitted light being incident on the second surface of the display panel and being transmitted through the transmitting window toward the first surface of the display panel. The
(Continued)

illumination device further includes a diffuser diffusing the light transmitted through the transmitting window.

7 Claims, 16 Drawing Sheets

Related U.S. Application Data

(60) Provisional application No. 62/682,364, filed on Jun. 8, 2018.

(51) Int. Cl.
    *G02B 3/00*         (2006.01)
    *G02B 5/02*         (2006.01)

(52) U.S. Cl.
    CPC ......... *G02B 5/0221* (2013.01); *G02B 5/0278* (2013.01); *G02B 2207/101* (2013.01)

(58) Field of Classification Search
    CPC .... G02B 6/0035; G02B 6/0045; G02B 27/30; G02B 30/30; G01S 17/894; H04N 13/31
    See application file for complete search history.

(56) References Cited

U.S. PATENT DOCUMENTS

| | | | |
|---|---|---|---|
| 8,567,977 | B2 | 10/2013 | Pijlman et al. |
| 9,207,384 | B2 | 12/2015 | Bryan et al. |
| 9,599,323 | B2 | 3/2017 | Hara |
| 2010/0066957 | A1* | 3/2010 | Miyazaki .......... G02F 1/133504 349/112 |
| 2017/0082263 | A1* | 3/2017 | Byrnes .................. G02B 1/005 |
| 2018/0005005 | A1 | 1/2018 | He et al. |
| 2018/0267663 | A1 | 9/2018 | Cho et al. |
| 2019/0208044 | A1 | 7/2019 | Lee et al. |
| 2020/0050094 | A1 | 2/2020 | Han et al. |

FOREIGN PATENT DOCUMENTS

| | | |
|---|---|---|
| JP | 4844481 B2 | 12/2011 |
| JP | 5215090 B2 | 6/2013 |
| KR | 10-2009-0010993 A | 1/2009 |
| KR | 10-2009-0116811 A | 11/2009 |
| KR | 10-2010-0102774 A | 9/2010 |

\* cited by examiner

ILLUMINATION DEVICE AND ELECTRONIC DEVICE INCLUDING THE SAME

CROSS-REFERENCE TO RELATED APPLICATIONS

This is a divisional application of U.S. application Ser. No. 16/434,614 filed Jun. 7, 2019, which claims priority from U.S. Provisional Application No. 62/682,364, filed on Jun. 8, 2018, in the U.S. Patent and Trademark Office, and Korean Patent Application No. 10-2019-0031771, filed on Mar. 20, 2019, in the Korean Intellectual Property Office, the disclosures of which are incorporated herein by reference in their entireties.

BACKGROUND

1. Field

Apparatuses consistent with embodiments relate to an illumination device and an electronic device including the same.

2. Description of the Related Art

Technologies related to mobile devices like a smartphone equipped with a proximity sensor, a 3D depth sensor, and the like are being developed. A smartphone includes a display panel including display pixels. Also, a separate space is provided on the front surface of the smartphone, the separate space is distinguished from an space on which an image from the display panel is displayed, and an illumination device is formed to emit light through the separate space, the light being for a proximity sensor, a 3D depth sensor, and the like. However, when such a separate space is provided on the front surface of a smartphone, the front surface of the smartphone may not be fully used as a display surface.

Recently, display panels of smart phones tend to be developed for full-screen-type displays. Therefore, a technology for appropriately arranging an illumination device for a proximity sensor and a 3D depth sensor while using the entire front surface of a smartphone as a display surface is in demand.

SUMMARY

According to embodiments, there is provided an illumination device including a display panel including a first surface on which an image is displayed, a second surface opposite to the first surface, display pixels interposed between the first surface and the second surface, and a transmitting window interposed between the first surface and the second surface. The illumination device further includes a light source disposed on a side of the second surface of the display panel, and emitting light toward the second surface, and a light transmitter interposed between the light source and the display panel, and transmitting the emitted light to the transmitting window, the transmitted light being incident on the second surface of the display panel and being transmitted through the transmitting window toward the first surface of the display panel. The illumination device further includes a diffuser diffusing the light transmitted through the transmitting window, the diffused light being irradiated onto a front surface of a target object.

The display panel may further include a non-pixel region without the display pixels.

The transmitting window may be disposed in the non-pixel region.

The display panel may further include two or more non-pixel regions including the non-pixel region, and the display pixels and the two or more non-pixel regions may be alternately arranged.

The light source may include light-emitting elements disposed at positions respectively corresponding to positions of the two or more non-pixel regions.

The light source may include light-emitting elements, and a size of the transmitting window may correspond to a size of one or more of the light-emitting elements.

A size of the transmitting window may correspond to a size of one or more of the display pixels.

The light transmitter may include a collimating member transforming the emitted light into parallel light having a beam width smaller than or equal to a diameter of the transmitting window, and transmitting the transformed light to the transmitting window.

The collimating member may include micro-lenses.

The light source may include light-emitting elements disposed at positions respectively corresponding to positions of the micro-lenses.

The collimating member may include meta-lenses.

The light source may include light-emitting elements disposed at positions respectively corresponding to positions of the meta-lenses, each of the meta-lenses may include nano-structures, and each of the nano-structures may have a dimension smaller than a wavelength of the emitted light.

Each of the meta-lenses may include a first nano-layer including first nano-structures, an intermediate layer disposed on the first nano-layer, and a second nano-layer disposed on the intermediate layer and including second nano-structures having shape distributions different from shape distributions of the first nano-structures.

The collimating member may be integrated with the light source.

The diffuser may include meta-lenses.

Each of the meta-lenses may include nano-structures, and each of the nano-structures may have a dimension smaller than a wavelength of the emitted light.

The diffuser may include micro-lenses.

The display panel may further include two or more transmitting windows including the transmitting window, and an interval between the micro-lenses may be smaller than or equal to an interval between the two or more transmitting windows.

The light source may be a vertical cavity surface emitting laser (VCSEL).

According to embodiments, there is provided an electronic device including an illumination device including a display panel including a first surface on which an image is displayed, a second surface opposite to the first surface, display pixels interposed between the first surface and the second surface, and a transmitting window interposed between the first surface and the second surface. The illumination device further includes a light source disposed on a side of the second surface of the display panel, and emitting light toward the second surface, and a light transmitter interposed between the light source and the display panel, and transmitting the emitted light to the transmitting window, the transmitted light being incident on the second surface of the display panel and being transmitted through the transmitting window toward the first surface of the display panel. The illumination device further includes a diffuser diffusing the light transmitted through the transmitting window, the diffused light being irradiated onto a front surface of a target object. The electronic device further includes a sensor configured to receive light that is reflected from the target object including the front surface onto which the diffused light is irradiated, and a processor configured to obtain information regarding the target object, from the received light.

According to embodiments, there is provided an illumination device including a display panel including a first surface on which an image is displayed, a second surface opposite to the first surface, display pixels interposed between the first surface and the second surface, and transmitting windows interposed between the first surface and the second surface. The illumination device further includes a light source including light-emitting elements emitting light toward the second surface, and a light transmitter interposed between the light source and the display panel, and including meta-lenses disposed at positions respectively corresponding to positions of the light-emitting elements, each of the meta-lenses including nano-structures transmitting the emitted light to the transmitting windows, and the transmitted light being incident on the second surface of the display panel and being transmitted through the transmitting windows toward the first surface of the display panel.

The illumination device may further include a diffuser diffusing the light transmitted through the transmitting windows, the diffused light being irradiated onto a target object.

The diffuser may include structural optical elements having irregular-shaped nano-structures for diffusing the light transmitted through the transmitting windows, and the structural optical elements may be disposed at positions respectively corresponding to positions of the transmitting windows.

Each of the meta-lenses may further include a substrate on which the nano-structures are disposed, and a width of each of the nano-structures in each of the annular regions gradually decreases or increases as a distance of a respective one of the nano-structures from a center of the substrate increases.

DETAILED DESCRIPTION

Figure 1:
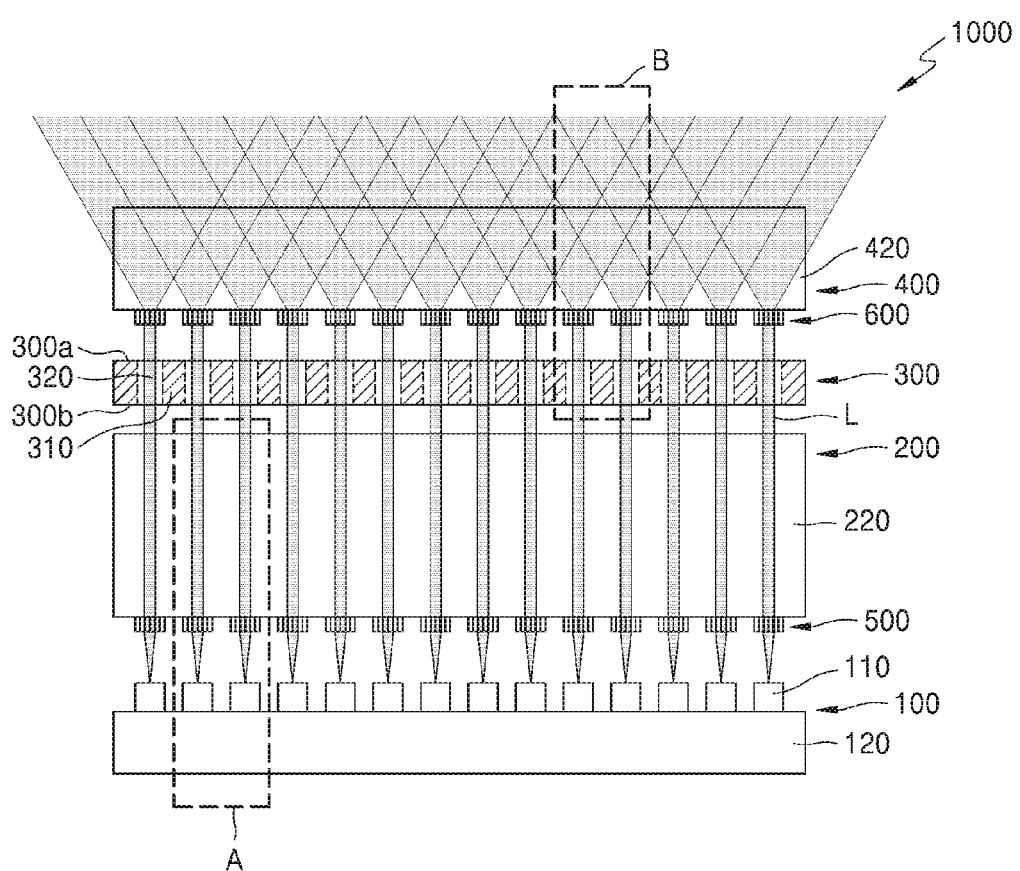
FIG. 1 is a schematic cross-sectional view of an illumination device according to embodiments.

Reference will now be made in detail to embodiments, examples of which are illustrated in the accompanying drawings, wherein like reference numerals refer to like elements throughout. In this regard, the embodiments may have different forms and may not be construed as being limited to the descriptions set forth herein. Accordingly, the embodiments are described below, by referring to the figures, to explain aspects. Expressions such as "at least one of," when preceding a list of elements, modify the entire list of elements and do not modify the individual elements of the list.

In the following, an illumination device and an electronic device including the illumination device according to embodiments will be described in detail with reference to the accompanying drawings. In the drawings, like reference numerals denote like elements, and the size and thickness of each element may be exaggerated for clarity of explanation.

While such terms as "first," "second," etc., may be used to describe various elements, such elements must not be limited to the above terms. The above terms may be used only to distinguish one element from another. An illumination device and an electronic device including the same, however, may be embodied in many different forms and may not be construed as limited to the embodiments set forth herein.

In addition, unless explicitly described to the contrary, the word "comprise" and variations such as "comprises" or "comprising" will be understood to imply the inclusion of stated elements but not the exclusion of any other elements.

Figure 2:
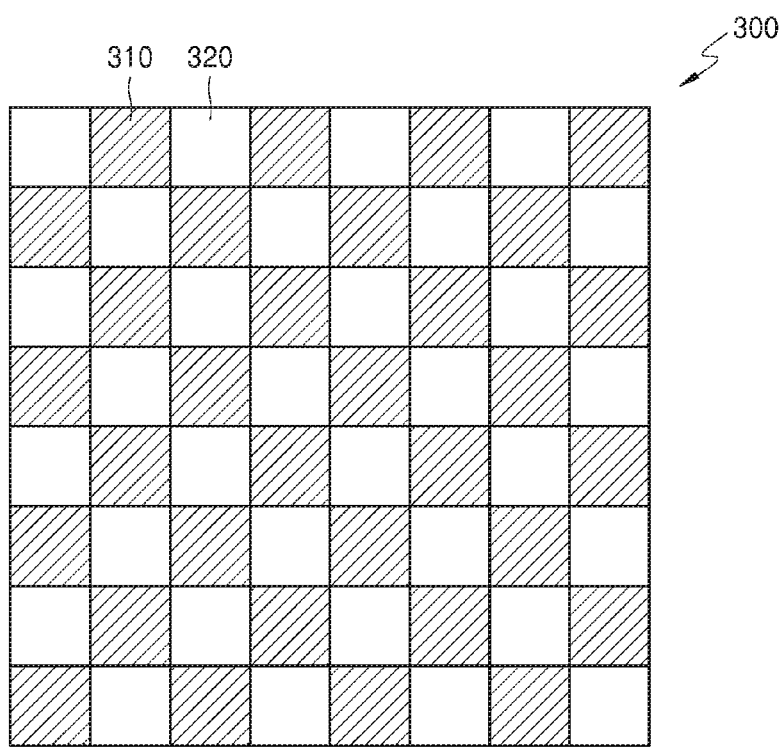
FIG. 2 is a plan view of an example arrangement of display pixels of a display panel employed in the illumination device of FIG. 1.
Figure 3:
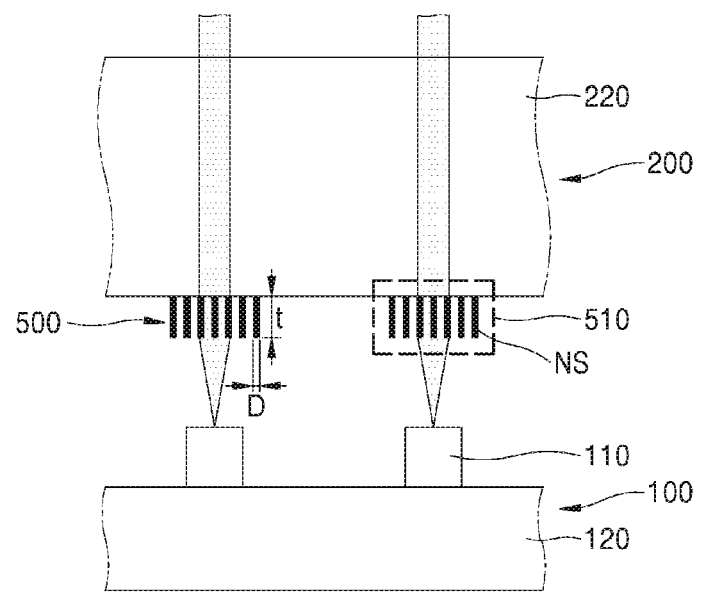
FIG. 3 is an enlarged view of a region A in FIG. 1.
Figure 4:
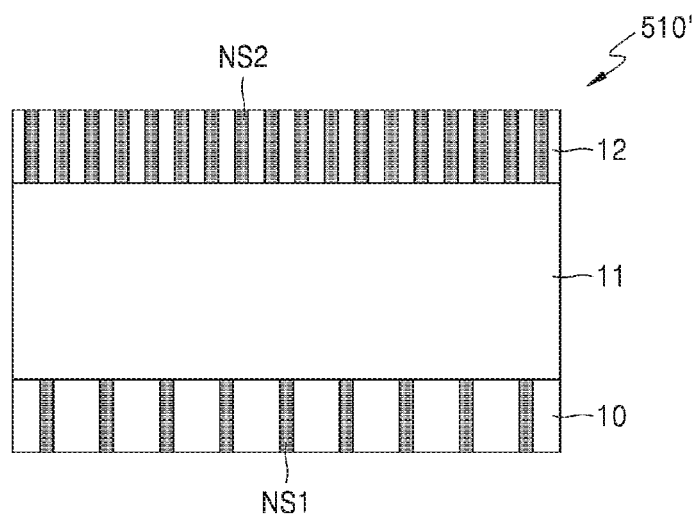
FIG. 4 is a cross-sectional view of an example configuration of a meta-lens that may be applied to FIG. 3.
Figure 5:
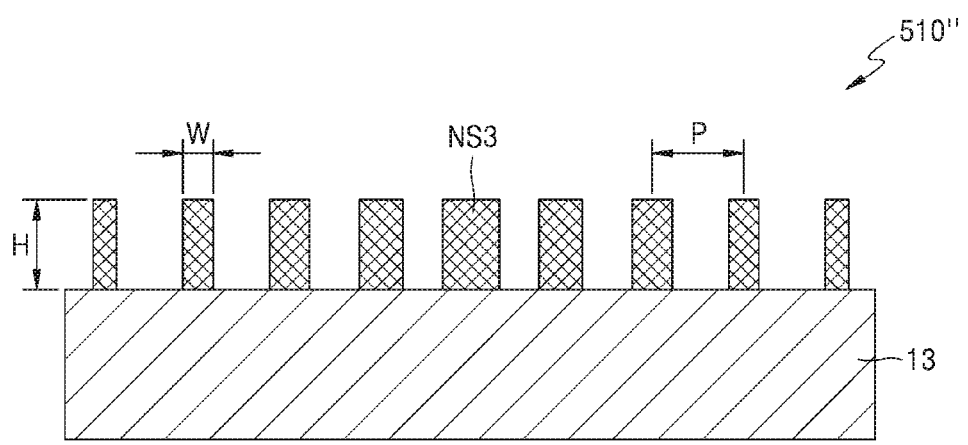
FIG. 5 is a cross-sectional view of an another example configuration of a meta-lens that may be applied to FIG. 3.
Figure 6:
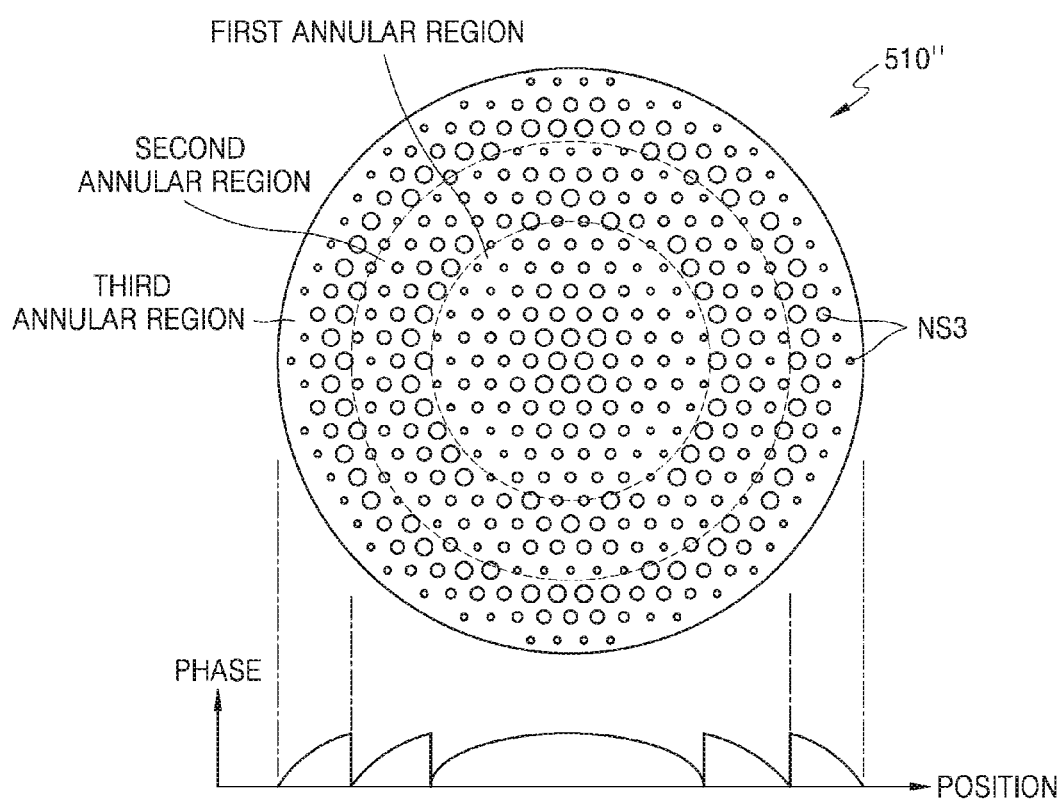
FIG. 6 is a top view of the meta-lens of FIG. 5.
Figure 7:
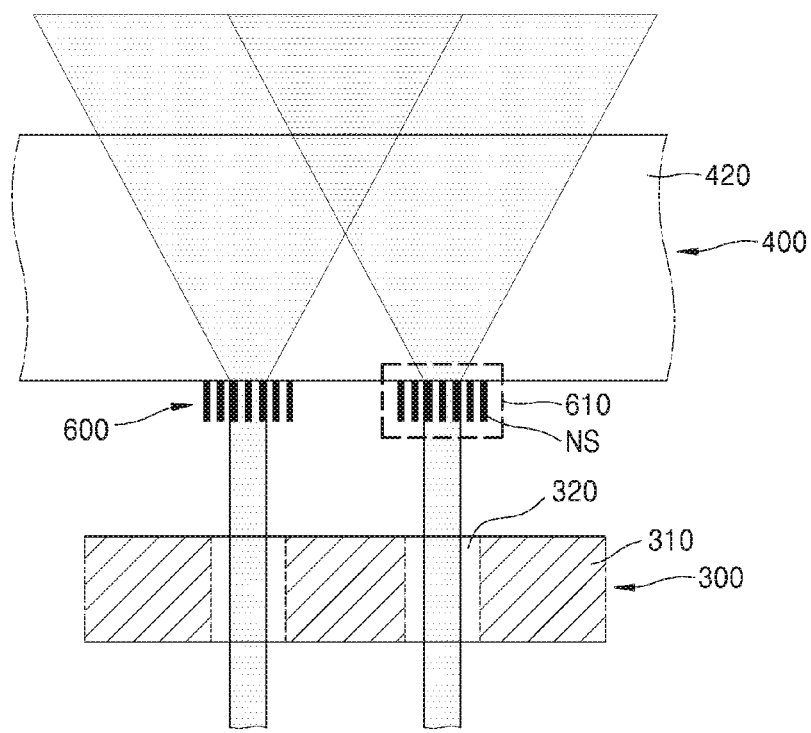
FIG. 7 is an enlarged view of a region B in FIG. 1.

FIG. 1 is a schematic cross-sectional view of an illumination device 1000 according to embodiments. FIG. 2 is a plan view of an example arrangement of display pixels 310 of a display panel 300 employed in the illumination device 1000 of FIG. 1. FIG. 3 is an enlarged view of a region A in FIG. 1. FIG. 4 is a cross-sectional view of an example configuration of a meta-lens 510' that may be applied to FIG. 3. FIG. 5 is a cross-sectional view of an example configuration of a meta-lens 510" that may be applied to FIG. 3. FIG. 6 is a top view of the meta-lens 510" of FIG. 5. FIG. 7 is an enlarged view of a region B in FIG. 1.

Referring to FIG. 1, the illumination device 1000 may include the display panel 300 including a first surface 300a on which an image is displayed, a second surface 300b opposite to the first surface 300a, the plurality of display pixels 310 arranged between the first surface 300a and the second surface 300b, and a transmitting window that transmits light L incident from the second surface 300b through the first surface 300a, a light source 100 disposed toward the second surface 300b of the display panel 300 and emitting light to be irradiated to a target object toward the second surface 300b, a light transmitter 200 that is disposed between the light source 100 and the display panel 300 and transmits the light L emitted from the display panel 300 to the transmitting window of the display panel 300, and a diffuser 400 that diffuses the light L transmitted through the transmitting window of the display panel 300, such that the light L is irradiated to the front surface of the target object.

The light source 100 may be an array of a plurality of light-emitting elements 110 disposed on a substrate 120. A light-emitting element 110 may be an LED or a laser diode that emits a laser beam. The light-emitting element 110 may include a vertical cavity surface emitting laser (VCSEL). Alternatively, the light-emitting element 110 may be a distributed feedback laser (DFB). The light-emitting element 110 may include, for example, an active layer including a Group III-V semiconductor material or a Group II-VI semiconductor material and having a multi-quantum well structure, but the disclosure is not limited thereto. The light-emitting element 110 may emit a laser beam of approximately 850 nm or 940 nm or may emit light in the near-infrared or visible light wavelength band. The wavelength of light emitted by the light-emitting element 110 is not particularly limited, and the light-emitting element 110 that emits light in a desired wavelength band may be used.

The display panel 300 includes the first surface 300a on which an image is displayed and the second surface 300b opposite to the first surface 300a, wherein the plurality of display pixels 310 may be arranged between the first surface 300a and the second surface 300b. Hereinafter, the first surface 300a on which an image is displayed on the display panel 300 may also be referred to as a 'display surface'. A non-pixel region 320 is disposed between the display pixels 310 and serves as a transmitting window through which light is transmitted. Hereinafter, a non-pixel region may also be referred to as a 'transmitting window'.

As known in the art, the display panel 300 includes a display element, e.g., a liquid crystal display (LCD), an organic light-emitting display (OLED), etc. When the display element is an LCD, a light source therefor is separately provided in the display panel 300. A display element is divided into a plurality of regions that are controlled to be on/off according to image information, and the regions are referred to as the display pixels 310. The display pixel 310 includes a display element and circuit elements for controlling the display element, and the display pixels 310 become opaque regions due to a metal included therein. In other words, light incident on the display pixel 310 from below the display panel 300 is reflected and not emitted through the front surface of the display panel 300. The non-pixel region 320 is a region without the display pixel 310 and is not related to control a display to be on/off. The non-pixel region 320 is a region in which at least some of the circuit elements for controlling the display element, e.g., a metal pixel electrode, are not provided, and thus light may be transmitted therethrough. Therefore, the light L incident on the non-pixel region 320 may be emitted through the display surface of the display panel 300.

As shown in FIG. 2, the display panel 300 may include two or more non-pixel regions 320. The plurality of display pixels 310 and the non-pixel regions 320 may be alternately arranged. Although FIG. 2 shows that the sizes of the display pixel 310 and the non-pixel region 320 are the same, it is an example. The size of the non-pixel region 320 may be larger or smaller than that of the display pixel 310. Furthermore, the plurality of light-emitting elements 110 may be provided at positions respectively corresponding to those of the non-pixel region 320. In this case, the size of a transmitting window may be a size corresponding to one light-emitting element 110. Therefore, the light L emitted from each of the plurality of light-emitting elements 110 may travel to the non-pixel region 320 more efficiently. However, the disclosure is not limited thereto. For example, each non-pixel region 320 may correspond to two or more light-emitting elements 110. In this case, the size of the transmitting window may be a size corresponding to the two or more light-emitting elements 110.

As described above, the illumination device 1000 according to embodiments may illuminate the front of the display surface of the display panel 300 with the light L from the light source 100 disposed on the rear surface of the display panel 300, which is formed by replacing some of the display pixels 310 with the non-pixel region 320 in a display panel.

The light transmitter 200 may be provided between the light source 100 and the display panel 300 and serve as a guide for the light L from the light source 100 to pass through the transmitting window of the display panel 300. For example, the light transmitter 200 may guide the light L from the light source 100 to become parallel light and travel toward the display panel 300. The light transmitter 200 may include a collimating member 500 that transforms the light L from the light source 100 into parallel light. For example, the collimating member 500 may make the light L from the light source 100 into parallel light having a beam width that is less than or equal to the diameter of the transmitting window. Furthermore, the light transmitter 200 may include a substrate 220. The substrate 220 may include, for example, glass. However, the disclosure is not limited thereto, and the substrate 220 may include a material capable of transmitting light other than glass. The collimating member 500 may be provided on the rear surface of the substrate 220. Details of the structure of the collimating member 500 will be described below with reference to FIG. 3.

Referring to FIG. 3, the collimating member 500 may include, for example, a plurality of meta-lenses 510. The plurality of meta-lenses 510 may be provided at positions respectively corresponding to those of the plurality of light-emitting elements 110. Each of the plurality of meta-lenses 510 may make the light L from each of the plurality of light-emitting elements 110 into parallel light. Parallel light formed by the meta-lens 510 may be transmitted through the substrate 220.

Each of the plurality of meta-lenses 510 may include a plurality of nano-structures NS. The thickness t or the width D, which is a dimension defining the shape of a nano-structure NS, may be less than the wavelength of the light L from the light source 100. Each of the plurality of nano-structures NS may have a cylindrical shape, an elliptical shape, a polygonal shape, or various other shapes. The nano-structure NS includes a material having a refractive index higher than that of a surrounding material (e.g., the air) or the substrate 220, e.g., a material including any one of a monocrystalline silicon, a polycrystalline silicon, an amorphous silicon, $Si_3N_4$, GaP, $TiO_2$, AlSb, AlAs, AlGaAs, AlGaInP, BP, and $ZnGeP_2$. The substrate 220 supports the plurality of nano-structures NS and may include a material having a lower refractive index than the nano-structure NS. A difference between the refractive indexes of the substrate 220 and the nano-structures NS may be about 0.5 or greater. The substrate 220 may include, for example, $SiO_2$, a transparent conductive oxide (TCO), or a polymer like PC, PS, and PMMA, but the disclosure is not limited thereto.

The nano-structures NS may change the traveling direction of incident light depending on the shape and the arrangement thereof. Furthermore, the shape distribution of the nano-structure NS may be determined, such that the meta-lens 510 serves as a collimating lens for transforming the light L from the light source 100 into parallel light. Here, the 'shape distribution' refers to any one or any combination of the shape of the nano-structure NS, the size of the nano-structure NS, and the distribution of the arrangement pitch of the plurality of nano-structures NS. Any one or any combination of the thickness, the width, and the arrangement interval of the nano-structures NS may be less than or half the wavelength of the light source 100. Although FIG. 3 shows that the nano-structures NS having a constant size are arranged at a constant interval, it is an example, and the disclosure is not limited thereto. An example nano-structure NS that may be applied to the meta-lens 510 will be described below with reference to FIGS. 4 to 6.

Referring to FIG. 4, a meta-lens 510' may include a first nano-layer 10 including a plurality of first nano-structures NS1, an intermediate layer 11 provided on the first nano-layer 10, and a second nano-layer 12 provided on the intermediate layer 11 and including a plurality of second nano-structures NS2. A material having a lower refractive index than the plurality of first nano-structures NS1 may be provided between the plurality of first nano-structures NS1. Similarly, a material having a lower refractive index than the refractive index of the plurality of second nano-structures NS2 may be provided between the plurality of second nano-structures NS2. A first nano-structure NS1 and a second nano-structure NS2 may have dimensions of a sub-wavelength smaller than the wavelength of incident light. The first nano-structure NS1 and the second nano-structure NS2 may change the traveling direction of incident light depending on the shapes and the arrangements thereof. Furthermore, the shape distributions of the plurality of first nano-structures NS1 and the plurality of second nano-structures NS2 may be determined, such that a meta-lens 510' serves as a collimating lens that transforms incident light into parallel light.

Furthermore, the shape distribution of the plurality of first nano-structures NS1 may be different from that of the plurality of second nano-structures NS2. As the first nano-layer 10 and the second nano-layer 12 including a plurality of nano-structures having different shape distributions are included, the meta-lens 510' may precisely collimate light. The intermediate layer 11 may include a material having a refractive index lower than those of the first nano-structure NS1 and the second nano-structure NS2.

Referring to FIG. 5, a meta-lens 510" may include a substrate 13 and a plurality of nano-structures NS3 provided on the substrate 13. The substrate 13 may correspond to the substrate 220 of FIG. 3. The width W of each of the plurality of nano-structures NS3 may decrease as the distance from the center of the substrate 13 increases. Although FIG. 5 shows that the plurality of nano-structures NS3 have the same height H, the disclosure is not limited thereto. For example, the height H of the plurality of nano-structures NS3 may be different from one another. A distance P between the centers of the plurality of nano-structures NS3 may be constant. However, the disclosure is not limited thereto, and the distance P between the centers of the plurality of nano-structures NS3 may vary as the distance from the center of the substrate 13 increases. Referring to FIG. 6, the shape of the meta-lens 510" viewed from above will be described below.

Referring to FIG. 6, the meta-lens 510" may include a plurality of annular regions in which the diameters of the nano-structures NS3 gradually decrease or increase as the distances from one point on the meta-lens 510" increases. For example, the meta-lens 510" may include a first annular region and a second annular region in a direction away from the center of the meta-lens 510".

Depending on the position of the nano-structure NS3 on the substrate 13, the phase of light emitted from the meta-lens 510" may vary. For example, the phase of light emitted from the meta-lens 510" may gradually decrease in the direction from the center of the first annular region toward the periphery of the first annular region. Also, the phase of light emitted from the meta-lens 510" may rapidly increase between the first annular region and the second annular region. Furthermore, the phase of light emitted from the meta-lens 510" may decrease in the second annular region toward the third annular region and rapidly increase between the second annular region and the third annular region.

The optical characteristics of light collimated by the meta-lens 510" including the shape, the angle, and the chromatic dispersion, may vary according to factors including the diameter of the nano-structure NS3, the cross-sectional shape of the nano-structure NS3, and the material of the nano-structure NS3, the distance between the nano-structures NS3, and the shapes of annular regions.

The diffuser 400 may be provided on the display panel 300 and diffuse light that passed through the non-pixel region 320. The diffuser 400 may include a light diffusing member 600 that diffuses light that passed through the non-pixel region 320. The light diffusing member 600 may diffuse light that passed through the non-pixel region 320 to illuminate the front surface of a target object with uniform brightness. Also, for example, the field of view of light that passed through the diffuser 400 may be between 60° and 80°. However, the disclosure is not limited thereto, and the field of view of light that passed through the diffuser 400 may be less than 60° or greater than 80°. Furthermore, the diffuser 400 may include a substrate 420. The substrate 420 may, for example, include glass. However, the disclosure is not limited thereto, and the substrate 420 may include a material capable of transmitting light other than glass. The light diffusing member 600 may be provided on the rear surface of the substrate 420. Details of the structure of the light diffusing member 600 will be described below with reference to FIG. 5.

Referring to FIG. 3, the light diffusing member 600 may include, for example, a plurality of meta-lenses 610. The plurality of meta-lenses 610 may be provided at positions respectively corresponding to those of transmitting windows. Therefore, parallel light transmitted through the transmitting windows may be incident on the plurality of meta-lenses 610.

The meta-lens 610 may include a plurality of nano-structures NS having dimensions smaller than the wavelength of incident light. The plurality of nano-structures NS may change the traveling direction of incident light depending on the shape and the arrangement thereof. Furthermore, the shape distribution of the nano-structure NS may be determined, such that the meta-lens 610 serves as a light diffusing element for diffusing light transmitted through a transmitting window. Light diffused by the meta-lens 610 may be transmitted through the substrate 420. The types and the properties of the materials of the nano-structures NS and the substrate 420 are the same as those described with reference to FIG. 3.

Figure 8:
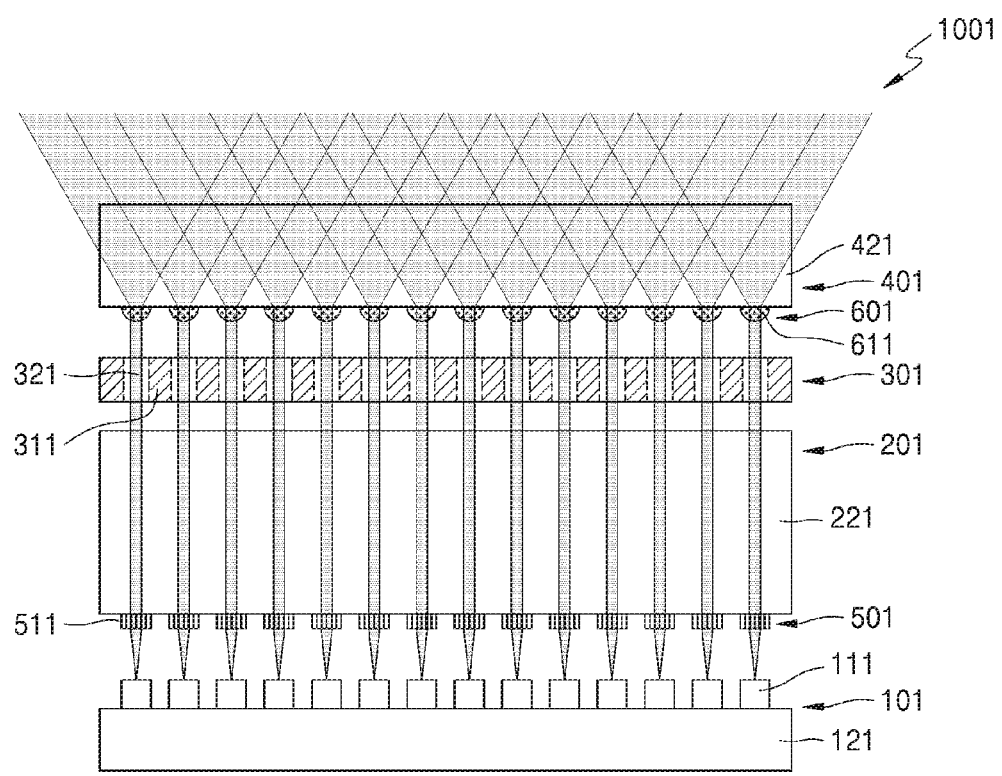
FIG. 8 is a schematic cross-sectional view of an illumination device according to embodiments.

FIG. 8 is a schematic cross-sectional view of an illumination device 1001 according to embodiments. Descriptions identical to those already given above with reference to FIGS. 1 to 7 will be omitted below.

Referring to FIG. 8, light from a light source 101 including a substrate 121 and a plurality of light-emitting elements 111 provided on the substrate 121 may travel to a light transmitter 201. The light transmitter 201 may include a substrate 221 and a collimating member 501 provided on the rear surface of the substrate 221. The collimating member

501 may include a plurality of meta-lenses 511, for example. Light passed through the light transmitter 201 may travel to a display panel 301.

The display panel 301 may include a plurality of non-pixel regions 321 and display pixels 311. Light may be transmitted through the non-pixel regions 321, that is, transmitting windows. Light transmitted through the transmitting windows may become parallel light as described above. A diffuser 401 may be provided over the display panel 301. The diffuser 401 may include a substrate 421 and a light diffusing member 601, which is disposed on the rear surface of the substrate 421 to diffuse light that passed through the non-pixel regions 321 that diffuses light from the transmitting windows. The light diffusing member 601 may include a plurality of micro-lenses 611. The plurality of micro-lenses 611 may be provided at positions respectively corresponding to those of the transmitting windows. Therefore, parallel light transmitted through the transmitting windows may be incident on the plurality of micro-lenses 611. However, the disclosure is not limited thereto, and the interval between the plurality of micro-lenses 611 may be smaller than or equal to the interval between the transmitting windows. In this case, because the plurality of micro-lenses 611 are arranged more densely than the transmitting windows, parallel light from the transmitting window may be diffused efficiently.

Figure 9:
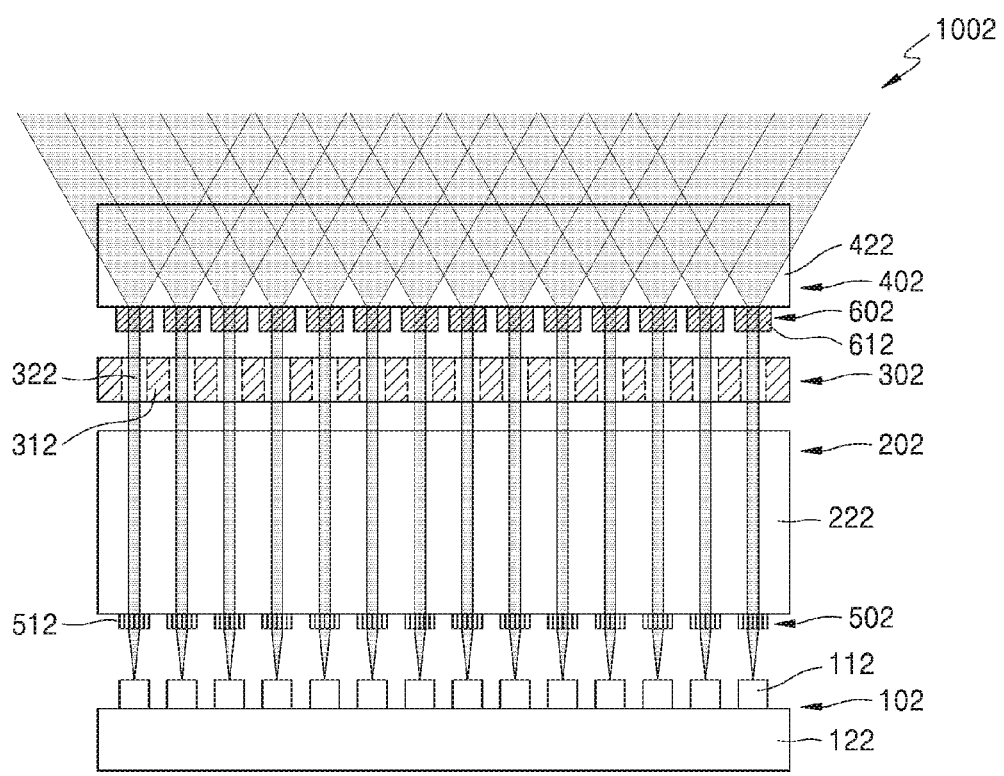
FIG. 9 is a schematic cross-sectional view of an illumination device according to embodiments.

FIG. 9 is a schematic cross-sectional view of an illumination device 1002 according to embodiments. Descriptions identical to those already given above with reference to FIGS. 1 to 7 will be omitted below.

Referring to FIG. 9, light from a light source 102 including a substrate 122 and a plurality of light-emitting elements 112 provided on the substrate 122 may travel to a light transmitter 202. The light transmitter 202 may include a substrate 222 and a collimating member 502 provided on the rear surface of the substrate 222. The collimating member 502 may include a plurality of meta-lenses 512, for example. Light passed through the light transmitter 202 may travel to a display panel 302.

The display panel 302 may include a plurality of non-pixel regions 322 and display pixels 312. Light may be transmitted through the non-pixel regions 322, that is, transmitting windows. Light transmitted through the transmitting windows may become parallel light as described above. A diffuser 402 may be provided over the display panel 302. The diffuser 402 may include a substrate 422 and a light diffusing member 602 disposed on the rear surface of the substrate 422 to diffuse light from the transmitting windows. The light diffusing member 602 may include a plurality of random structure optical elements 612. The plurality of random structure optical elements 612 refer to members having irregular-shaped nano-structures for diffusing incident light. For example, a random structure optical element 612 may include an opaque glass. The plurality of random structure optical elements 612 may be provided at positions respectively corresponding to those of the transmitting windows. Therefore, parallel light transmitted through the transmitting windows may be incident on the plurality of random structure optical elements 612. However, the disclosure is not limited thereto, and the interval between the plurality of random structure optical elements 612 may be smaller than or equal to the interval between the transmitting windows. In this case, because the plurality of random structure optical elements 612 are arranged more densely than the transmitting windows, parallel light from the transmitting window may be diffused efficiently. Alternatively, for example, the random structure optical element 612 may be a single structure having a size corresponding to that of the entire rear surface of the substrate 422.

Figure 10:
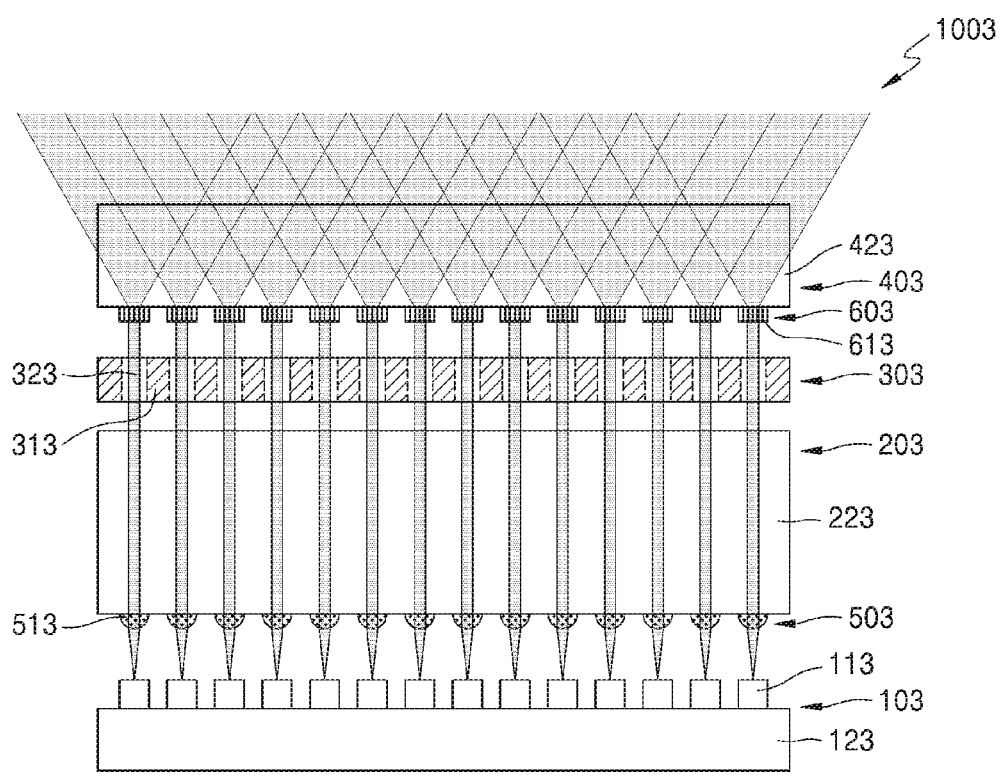
FIG. 10 is a schematic cross-sectional view of an illumination device according to embodiments.

FIG. 10 is a schematic cross-sectional view of an illumination device 1003 according to embodiments. Descriptions identical to those already given above with reference to FIGS. 1 to 7 will be omitted below.

Referring to FIG. 10, a light source 103 may include a substrate 123 and a plurality of light-emitting elements 113 provided on the substrate 123. A light transmitter 203 may be located on a path along which light travels from the plurality of light-emitting elements 113. The light transmitter 203 may include a substrate 223 and a collimating member 503 provided on the rear surface of the substrate 223. The collimating member 503 may include a plurality of micro-lenses 513, for example. The plurality of micro-lenses 513 may be provided at positions respectively corresponding to those of the plurality of light-emitting elements 113. Each of the plurality of micro-lenses 513 may make light from each of the plurality of light-emitting elements 113 into parallel light. Parallel light formed by the micro-lens 513 may be transmitted through the substrate 223.

And, light transmitted through a display panel 303 may travel toward a diffuser 403. The display panel 303 may include a plurality of non-pixel regions 323 and display pixels 313. The diffuser 403 may include a substrate 423 and a light diffusing member 603 provided on the rear surface of the substrate 423. Although FIG. 10 shows that the light diffusing member 603 includes a plurality of meta-lenses 613, the disclosure is not limited thereto. For example, the light diffusing member 603 may include the plurality of micro-lenses 611 of FIG. 8. Alternatively, the light diffusing member 603 may include the plurality of random structure optical elements 612 of FIG. 9.

Figure 11:
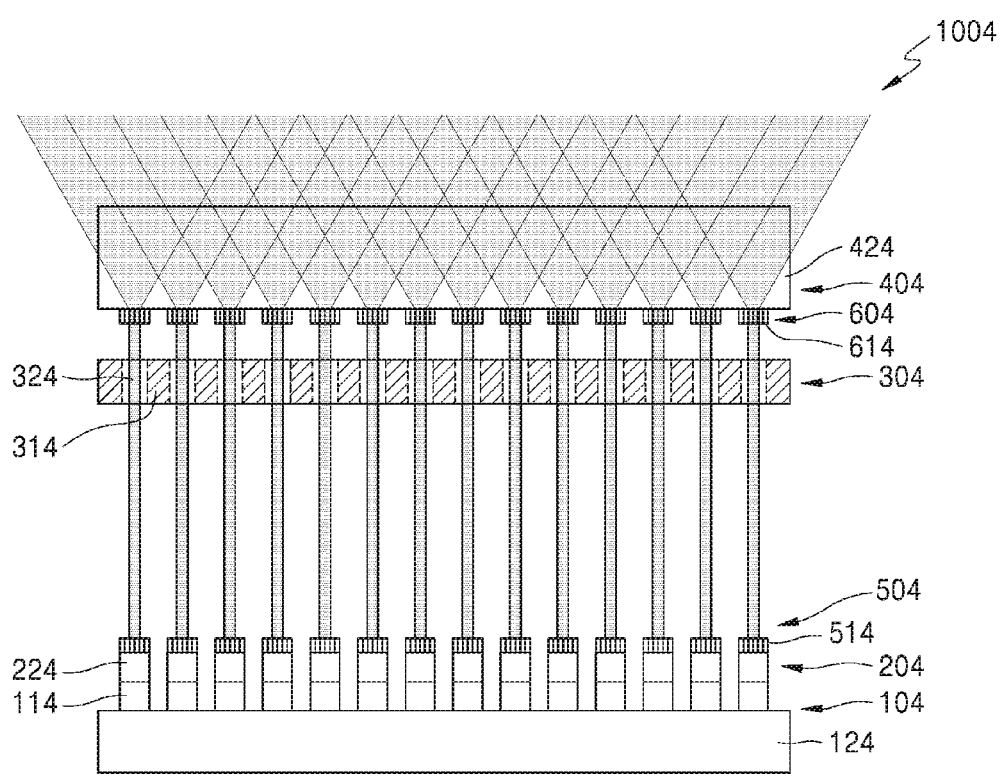
FIG. 11 is a schematic cross-sectional view of an illumination device according to embodiments.

FIG. 11 is a schematic cross-sectional view of an illumination device 1004 according to embodiments. Descriptions identical to those already given above with reference to FIGS. 1 to 7 will be omitted below.

Referring to FIG. 11, a collimating member 504 may be integrated with a light source 104. For example, a substrate 224 may be provided on the top surface of each of a plurality of light-emitting elements 114 provided on a substrate 124. On the substrate 224, the collimating member 504 may be provided. Although FIG. 11 shows a plurality of meta-lenses 514 as the collimating member 504, the disclosure is not limited thereto. For example, the collimating member 504 may include the plurality of micro-lenses 513 of FIG. 10. As such, the light source 104, which includes the substrate 124 and the plurality of light-emitting elements 114, and a light transmitter 204, which includes the substrate 224 and the collimating member 504, may be integrated with each other.

And, light transmitted through a display panel 304 may travel toward a diffuser 404. The display panel 304 may include a plurality of non-pixel regions 324 and display pixels 314. The diffuser 404 may include a substrate 424 and a light diffusing member 604 provided on the rear surface of the substrate 424. Although FIG. 11 shows that the light diffusing member 604 includes a plurality of meta-lenses 614, the disclosure is not limited thereto. For example, the light diffusing member 604 may include the plurality of micro-lenses 611 of FIG. 8. Alternatively, the light diffusing member 604 may include the plurality of random structure optical elements 612 of FIG. 9.

Figure 12:
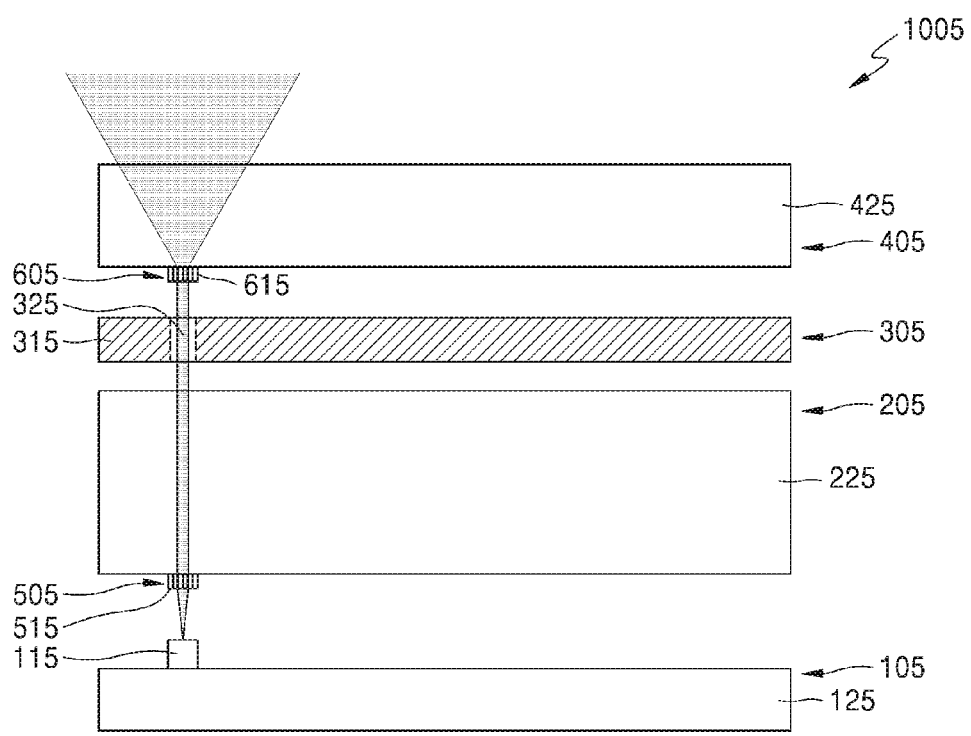
FIG. 12 is a schematic cross-sectional view of an illumination device according to embodiments.
Figure 13:
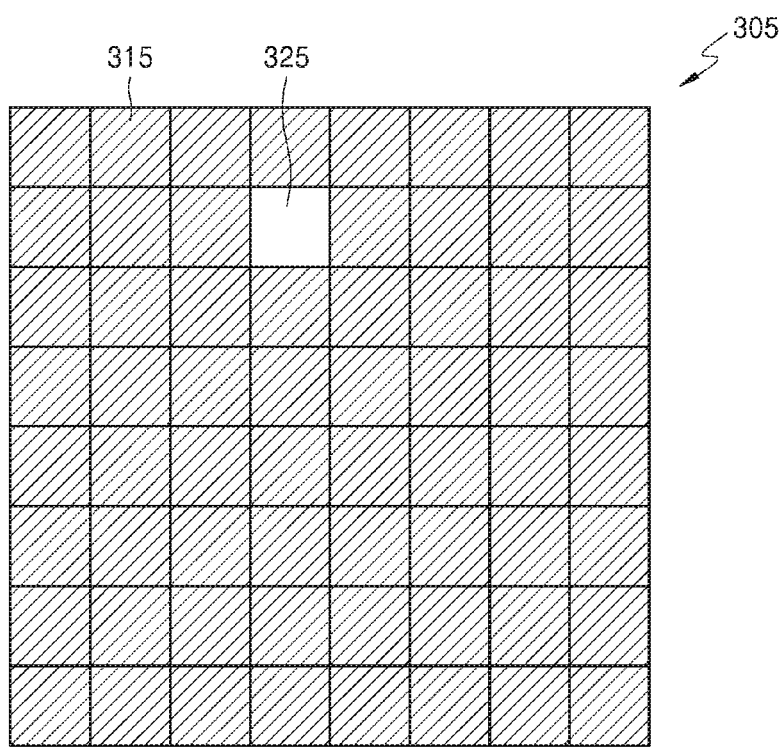
FIG. 13 is a plan view of an example arrangement of display pixels of a display panel employed in the illumination device of FIG. 12.

FIG. 12 is a schematic cross-sectional view of an illumination device 1005 according to embodiments. FIG. 13 is a plan view of an example arrangement of display pixels of a display panel employed in the illumination device 1005 of FIG. 12. Descriptions identical to those already given above with reference to FIGS. 1 to 7 will be omitted below.

Referring to FIG. 12, there may be one non-pixel region 325. Also, a light source 105 may include one light-emitting element 115. The light-emitting element 115 may be provided at a position corresponding to that of the non-pixel region 325. Also, a light transmitter 205 may include one collimating member 505 provided on the rear surface of a substrate 225. The collimating member 505 may include, for example, a meta-lens 515 provided at a position corresponding to that of the light-emitting element 115. However, the disclosure is not limited thereto, and the collimating member 505 may include a micro-lens. Furthermore, a diffuser 405 may include one light diffusing member 605 provided on the rear surface of a substrate 425. The light diffusing member 605 may include, for example, a meta-lens 615 provided at a position corresponding to that of the non-pixel region 325. However, the disclosure is not limited thereto, and the light diffusing member 605 may include a micro-lens or a random structure optical element. Accordingly, the light-emitting element 115, the meta-lens 515, the light diffusing member 605, and the non-pixel region 325 may be provided on a straight line.

Although FIG. 12 shows the configuration in which the light-emitting element 115 is provided apart from the meta-lens 515, the disclosure is not limited thereto. For example, as described with reference to FIG. 11, the light source 105 including a substrate 125 and the light-emitting element 115 and the light transmitter 205 including the substrate 225 and the collimating member 505 may be integrated with each other.

Although FIG. 12 shows that the light-emitting element 115 and the non-pixel region 325 are provided at positions corresponding to the edges of a display panel 305, the disclosure is not limited thereto. For example, the light-emitting element 115 and the non-pixel region 325 may be provided at positions corresponding to the center region of the display panel 305.

Referring to FIG. 13, the display panel 305 may include one non-pixel region 325. Display pixels 315 may be distributed in regions other than the non-pixel region 325 of a display surface. As described above, because the display pixel 315 is unable to transmit light from the rear surface of the display panel 305, providing the light-emitting element 115 at a position corresponding to a display pixel 315 may deteriorate the efficiency of the illumination device 1005. Therefore, by using the one light-emitting element 115 and the one non-pixel region 325, only some of regions of the display surface of the display panel 305 may be used as an illumination region.

Figure 14:
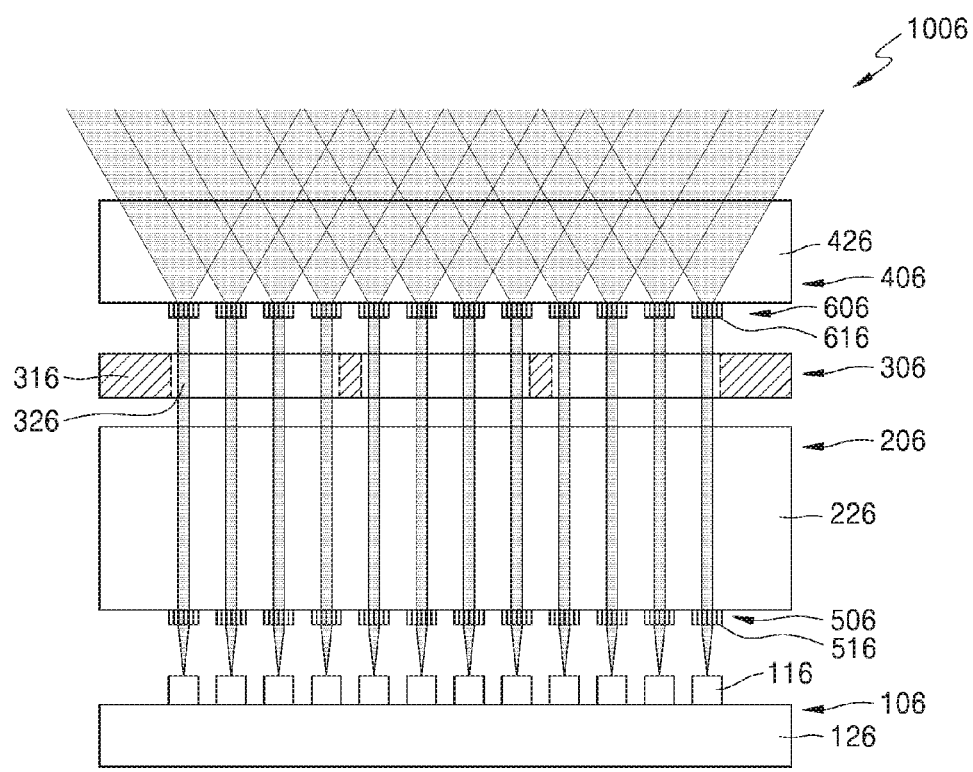
FIG. 14 is a schematic cross-sectional view of an illumination device according to embodiments.

FIG. 14 is a schematic cross-sectional view of an illumination device 1006 according to embodiments. Descriptions identical to those already given above with reference to FIGS. 1 to 7 will be omitted below.

Referring to FIG. 14, a display panel 306 may include a plurality of display pixels 316 and a plurality of non-pixel regions 326. As described above, a non-pixel region 326 is a region without a display pixel 316. In this case, one non-pixel region 326 may be a region without the plurality of display pixels 316. In other words, a region without a plurality of display pixels 316 adjacent to one another may be the one non-pixel region 326. Therefore, the size of the non-pixel region 326, that is, a transmitting window, may be a size corresponding to the plurality of display pixels 316. Also, light emitted from the plurality of light-emitting elements 116 and passed through a light transmitter 206 including a meta-lens 516 and a substrate 226 may be transmitted through one transmitting window. In other words, the size of the transmitting window may correspond to that of one or more of the plurality of light-emitting elements 116.

Although FIG. 14 shows the plurality of meta-lenses 516 as a collimating member 506, the disclosure is not limited thereto. For example, the collimating member 506 may include the plurality of micro-lenses 513 of FIG. 10.

Also, light transmitted through the display panel 306 may travel toward a diffuser 406. The diffuser 406 may include a substrate 426 and a light diffusing member 606 provided on the rear surface of the substrate 426. Although FIG. 14 shows that the light diffusing member 606 includes a plurality of meta-lenses 616, the disclosure is not limited thereto. For example, the light diffusing member 606 may include the plurality of micro-lenses 611 of FIG. 8. Alternatively, the light diffusing member 606 may include the plurality of random structure optical elements 612 of FIG. 9.

Furthermore, although FIG. 14 shows the configuration in which the light-emitting elements 116 are provided apart from the meta-lenses 516, the disclosure is not limited thereto. For example, as described with reference to FIG. 11, a light transmitter 106 including a substrate 126 and the light-emitting element 116 and the light transmitter 206 including the substrate 226 and the collimating member 506 may be integrated with each other.

Figure 15:
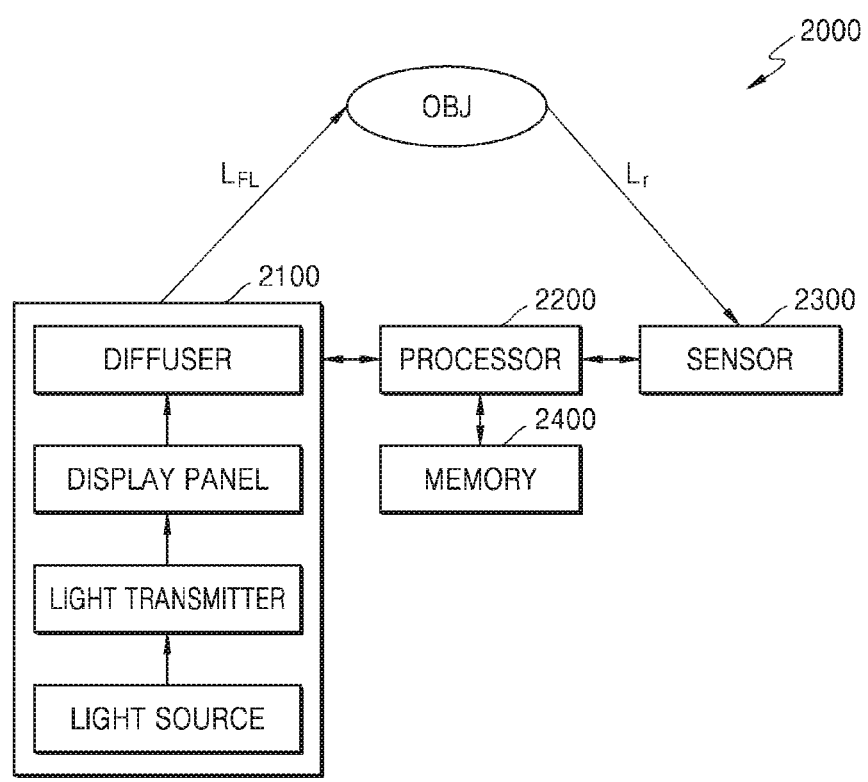
FIG. 15 is a block diagram showing a schematic configuration of an electronic device according to embodiments.

FIG. 15 is a block diagram showing a schematic configuration of an electronic device according to embodiments.

Referring to FIG. 15, an electronic device 2000 may include an illumination device 2100 that illuminates flood light toward a target object OBJ, a sensor 2300 that receives light reflected by the target object OBJ, and a processor 2200 for performing an calculation for obtaining information regarding the target object OBJ from the light received by the sensor 2300. The electronic device 2000 may also include a memory 2400 in which code or data for the operation of the processor 2200 is stored.

The illumination device 2100 includes a light source, a light transmitter, a display panel, and a diffuser and illuminates the target object OBJ through a transmitting window of the display panel by changing distribution of light from the light source, wherein the illumination devices 1000, 1001, 1002, 1003, 1004, 1005, and 1006, a combination thereof, and a modification thereof may be employed.

Optical elements for guiding flood light $L_{FL}$ from the illumination device 2100 to travel toward the target object OBJ or for additional modulation of the flood light $L_{FL}$ may be further arranged between the illumination device 2100 and the target object OBJ.

The illumination device 2100 may illuminate the target object OBJ with the flood light $L_{FL}$. The flood light $L_{FL}$ refers to light that illuminates the entire target object OBJ in a uniform light distribution at once. Here, the uniform light distribution is not necessarily 100% uniformity, but refers to substantially uniform illumination of an illumination target region of the target object OBJ. Therefore, the detailed configuration of a light transmitter or a diffuser of the illumination device 2100, that is, the shape distribution of nano-structures included in the light transmitter or the diffuser may be determined, such that a desired uniformity distribution of the flood light $L_{FL}$ is realized according to the position and the shape of the target object OBJ. The target object OBJ may be the face of a user of the electronic device 2000. The position of the target object OBJ may be, but is not limited to, about 30 cm to 1 m away from the illumination device 2100.

The sensor 2300 senses light $L_r$ reflected by the target object OBJ. The sensor 2300 may include an array of light detecting elements. The sensor 2300 may further include a spectroscopic element for analyzing light reflected by the target object OBJ by wavelengths.

The processor 2200 may perform an operation for obtaining information regarding the target object OBJ from light received by the sensor 2300. Also, the processor 2200 may manage the processing and controlling of the entire electronic device 2000. The processor 2200 may obtain information regarding the target object OBJ. For example, the processor 2200 may obtain and process 2-dimensional or 3-dimensional image information. The processor 2200 may also control operation of the sensor 2300 or a light source included in the illumination device 2100. The processor 2200 may also determine whether a user is authenticated or the like based on information obtained from the target object OBJ and may also execute other applications.

In the memory 2400, code to be executed in the processor 2200 may be stored. Also, the memory 2400 may store various execution modules to be executed by the electronic device 2000 and data for the execution modules. For example, the memory 2400 may store program code used by the processor 2200 for an calculation for obtaining information regarding the target object OBJ and code like application modules that may be executed by using the information regarding the target object OBJ. Also, the memory 2400 may further store a communication module, a camera module, a moving image playback module, an audio playback module, and the like as programs for operating devices that may be additionally provided in the electronic device 2000.

A result of an calculation by the processor 2200, that is, information regarding the shape and the position of the target object OBJ, may be transmitted to another device or another unit as occasions demand. For example, information regarding the target object OBJ may be transmitted to a controller of another electronic device using the information regarding the target object OBJ. The other unit to which a result of an calculation is transmitted may be a display device or a printer that outputs the result. In addition, the other unit may be, but is not limited to, a smartphone, a mobile phone, a personal digital assistant (PDA), a laptop PC, a desktop PC, various wearable devices, and other mobile or stationary computing devices.

The memory 2400 may be a flash memory, a hard disk, a multimedia card micro, a card type memory (e.g., an SD or XD memory), random access memory (RAM), static RAM (SRAM), a read-only memory (ROM), electrically erasable programmable ROM (EEPROM), programmable ROM (PROM), a magnetic memory, a magnetic disk, an optical disk, etc.

For example, the electronic device 2000 may be, but is not limited to, a portable mobile communication device, a smart phone, a smartwatch, a PDA, a laptop PC, a desktop PC, and other mobile or stationary computing devices. The electronic device 2000 may be an autonomously operating device like an unmanned vehicle, an autonomous driving vehicle, a robot, and a drone or an Internet-of-Things (IoT) device.

Figure 16:
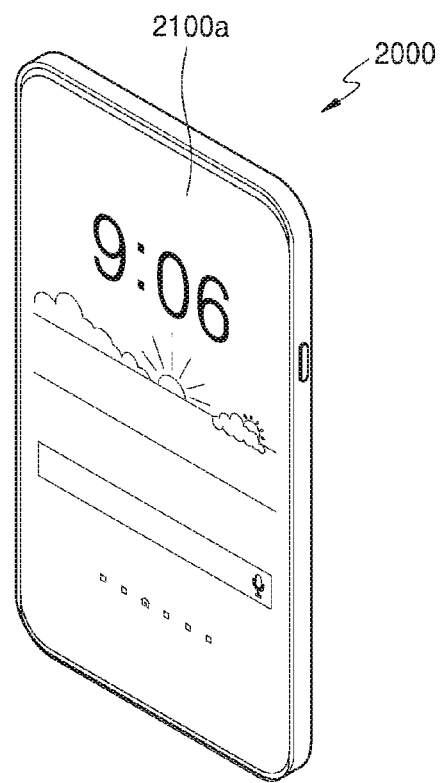
FIG. 16 is a perspective view of an example appearance of the electronic device of FIG. 15.

FIG. 16 is a perspective view of an example appearance of the electronic device 2000 of FIG. 15.

Referring to FIG. 16, the electronic device 2000 may employ a full-screen display type display. In other words, the electronic device 2000 may be a bezel-less type in which a display surface 2100*a* occupies almost the entire region of the front surface of the electronic device 2000. Also, the shape of the display surface 2100*a* may be a rectangular shape without a notch.

As described above, an illumination device according to embodiments may be disposed on the rear surface of a display panel and illuminate the front surface of the display panel through a transmitting window uniformly distributed throughout a display surface or a transmitting window formed in one region having a size. Therefore, a bezel-less and notch-free display as shown in FIG. 16 may be applied to the electronic device 2000.

The implementations described in the embodiments are illustrative and do not in any way limit the scope of the disclosure. For clarity of description, descriptions of conventional electronic configurations, control systems, software, and other functional aspects of such systems may be omitted. Also, connections of lines or connecting members between the components shown in the drawings are example illustrations of functional connections and/or physical or circuit connections, which may be replaced with or additionally provided by various functional connections, physical connections, or circuit connections.

It may be understood that the embodiments described herein may be considered in a descriptive sense only and not for purposes of limitation. Descriptions of features or aspects within each embodiment may be considered as available for other similar features or aspects in other embodiments.

While the embodiments have been described with reference to the figures, it will be understood by those of ordinary skill in the art that various changes in form and details may be made therein without departing from the spirit and scope as defined by the following claims.

What is claimed is:

1. An illumination device comprising: a display panel comprising: a first surface on which an image is displayed; a second surface opposite to the first surface; display pixels interposed between the first surface and the second surface; and a plurality of transmitting windows interposed between the first surface and the second surface; a light source disposed on a side of the second surface of the display panel, and emitting light toward the second surface; a light transmitter interposed between the light source and the display panel, and transmitting the light emitted by the light source to the transmitting windows, the light transmitted by the light transmitter being incident on the second surface of the display panel and being transmitted through the transmitting windows toward the first surface of the display panel; and a diffuser diffusing the light transmitted through the transmitting windows, the light diffused by the diffuser being irradiated onto a front surface of a target object, wherein the light transmitter comprises a collimating member transforming the emitted light into parallel light having a beam width smaller than or equal to a diameter of each of the plurality of the transmitting windows, the collimating member transmitting the transformed light to the plurality of transmitting windows which are arranged in a same layer of the illumination device.

2. The illumination device of claim 1, wherein the collimating member comprises micro-lenses.

3. The illumination device of claim 2, wherein the light source comprises light-emitting elements disposed at positions respectively corresponding to positions of the micro-lenses.

4. The illumination device of claim 1, wherein the collimating member comprises meta-lenses.

5. The illumination device of claim 4, wherein the light source comprises light-emitting elements disposed at positions respectively corresponding to positions of the meta-lenses,
- each of the meta-lenses comprises nano-structures, and
- each of the nano-structures has a dimension smaller than a wavelength of the emitted light.

6. The illumination device of claim 5, wherein each of the meta-lenses comprises:
- a first nano-layer comprising first nano-structures;
- an intermediate layer disposed on the first nano-layer; and
- a second nano-layer disposed on the intermediate layer and comprising second nano- structures having shape distributions different from shape distributions of the first nano-structures.

7. The illumination device of claim 1, wherein the collimating member is integrated with the light source.

* * * * *